Feb. 13, 1968    M. F. A. JULIEN    3,368,824
VEHICLE SUSPENSION DEVICES
Filed Jan. 24, 1966    2 Sheets-Sheet 1

United States Patent Office 3,368,824
Patented Feb. 13, 1968

3,368,824
VEHICLE SUSPENSION DEVICES
Maurice Francois Alexandre Julien, Paris, France, assignor to Paulstra, Levallois-Perret, France, a society of France
Filed Jan. 24, 1966, Ser. No. 522,557
Claims priority, application France, Feb. 2, 1965, 4,152
8 Claims. (Cl. 280—106.5)

The present invention relates to suspension devices for vehicles running on pneumatic tires and more especially to suspension devices interposed between the "suspended" rigid frame of the vehicle and the wheels thereof, which may be considered as "half suspended" through pneumatic tires.

The chief object of the present invention is to provide a suspension device of this type which is better adapted to meet the requirements of practice than those known up to this time.

The suspension device according to the present invention comprises a spring, in particular a compression helical spring, and a shock absorber, in particular of the hydraulic telescopic type, both mounted in parallel between the frame of the vehicle and a half suspended structure thereof, such as a wheel axle journal. It is characterized in that, on the one hand, the shock absorber is linked to the suspended frame and the half suspended structure of the vehicle, respectively, through connections capable of ensuring, in the direction of action of the shock absorber, a resilient linking which is flexible for small relative displacements and stiff for great displacements, and, on the other hand, the element of said shock absorber that is linked to the half suspended structure includes a heavy mass chosen in such manner as to damp the oscillations of said parts at relatively high frequencies, in particular ranging from 6 to 12 Hertz. Preferably this mass consists of a sleeve having thick walls and surrounding or constituting the external tube of the shock absorber if the latter is of the telescopic type, the connection between the shock absorber and the half suspended structure being advantageously arranged so that the deformations it undergoes during the resilient transmission of small relative displacements are more damped than those corresponding to the other connection.

According to another feature of the invention, intended more particularly to connections intended resiliently to transmit the relative displacements of a first element to a second element, and inversely, in a relatively flexible fashion for displacements of small amplitudes and in a relatively stiff fashion for displacements of great amplitude, said connections are constituted by two concentric and coaxial sleeves rigid with the two above mentioned elements respectively and connected to each other through a mass of elastomer capable of undergoing, on the one hand, shearing stresses for small relative displacements of said sleeve in a diametral direction and, on the other hand, compression stresses as soon as these relative displacements exceed a predetermined value, said mass preferably comprising, on the one hand, two arms extending radially from one sleeve to the other perpendicularly to the direction of said relative displacements and, on the other hand, two pads interposed, with a clearance between them, between said two sleeves in said direction.

A preferred embodiment of the present invention will be hereinafter described with reference to the appended drawings, given merely by way of example, and in which:

FIG. 1 diagrammatically shows a suspension device according to the present invention;

Figure 2:
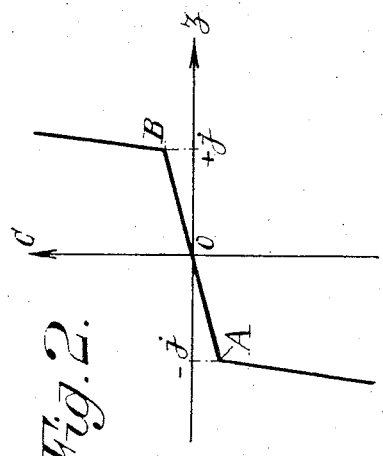
FIG. 2 is a diagram illustrating the characteristics of operation of this device.

It should be reminded that it is known to provide in a suspension device a combination of a main spring, in particular a compression helical spring, and of a shock absorber, in particular of the hydraulic type, both of these elements being mounted in parallel between the frame and the wheel, or, to be more accurate, a half suspended part carrying the stub axle of this wheel.

This shock absorber must perform two functions.

First, in order to ensure comfort of the suspension in the best possible conditions it must be capable of damping, together with the main spring, the oscillations of great amplitude (some centimeters) and of low frequency (from 0.8 to 2 Hz.) of the vehicle frame, which oscillations are produced by individual obstacles or undulations of great wavelength (some meters) of the road along which the vehicle is running. Secondly, in order to ensure a good holding of the road by the vehicle, the suspension device must absorb, together with the pneumatic tire, the oscillations of low amplitude (some millimeters) and of higher frequency (from 6 to 12 Hz.) of the half suspended masses connected with the wheels (wheel rims, hubs, axles, axle carriers, brakes and parts of the axles and springs), which oscillations are produced by unequalities and undulations of small wavelength (some decimeters) of the road.

As a rule, the shock absorber is linked respectively with the vehicle frame and with the above mentioned half suspended structure through connections having a relatively low resiliency in the direction in which the shock absorber is working.

The drawback of such as arrangement is that, in accordance with the principle of action and reaction, the shock absorbing stresses developed by the shock absorber are nearly fully transmitted to the vehicle frame, which is advantageous for absorbing the oscillations of this frame but objectionable concerning the relatively high frequency oscillations of the half suspended part. As a matter of fact the transmission to the frame of the shock absorbing stresses corresponding to said last mentioned oscillations produces vibrations which are very disagreeable for the vehicle passengers.

In order to obviate this drawback, it has already been proposed to increase the resiliency of the shock absorber connections in the direction where said shock absorber is working (such a mounting being sometime called "relaxation mounting"). This solution is advantageous concerning comfort but considerably reduces the efficiency of the absorption of the oscillations of half suspended masses at the cost of the holding of the road by the vehicle.

It has also been proposed to damp the two above mentioned types of oscillations separately, the low frequency big oscillations of the "suspended masses" being damped by shock absorbers of the above mentioned type mounted in "relaxation" fashion and the small oscillations at greater frequency of the "half suspended" masses being damped by means of "beaters" mounted directly on said last mentioned masses, in particular one for each wheel. This solution is satisfactory, but has the drawback of increasing the number of shock absorbers, and therefore the cost of the suspension device, this number being equal to eight for a four-wheel vehicle.

The present invention obviates these drawbacks by combining in a single damping device both of the two above mentioned damping functions. For this purpose, in order to damp the relative oscillations of a half suspended structure with respect to the frame, use is made of a single shock absorber mounted in parallel with the main spring between said frame and said half suspended structure and, On the one hand, each of the connections of said absorber with said frame and said half suspended structure, respectively, is given two successive degrees of resiliency in the working direction of the shock absorber, to wit a very great resiliency about the mean position of equilibrium for relative displacements of the order of some millimeters (for instance of the order of from 5 to 12 millimeters) and on the contrary a substantial stiffness for relative displacements of greater amplitude, and On the other hand, the element of the shock absorber which is linked (through a connection as above mentioned) with the half suspended structure is fitted with a heavy mass such that said element can act as a "beater" tuned to the frequencies of the oscillations of said structure that are to be damped.

Figure 1:
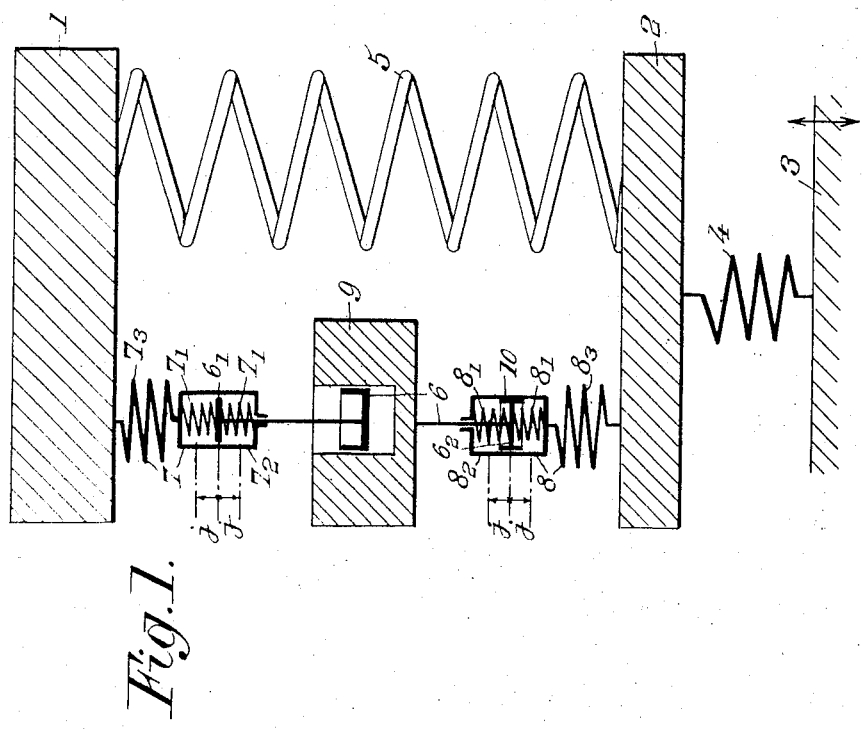

FIG. 1 diagrammatically shows a suspension device made as above stated.

The suspended mass (frame) of the vehicle is designated by reference numeral 1, the half suspended mass (wheel, axle carrier) by 2, the road by 3, the pneumatic tire by 4, the main spring by 5 and the shock absorber by 6.

The connections between shock absorber 6 and frame 1 on the one hand, and half suspended structure 2 on the other hand, have been designated by 7 and 8, respectively, and each of them comprises the following elements:

(a) Two relatively flexible small springs, $7_1$ (or $8_1$) bearing respectively in two opposite directions, on the one hand, upon one shock absorber end $6_1$ (or $6_2$) and, on the other hand, on the bottom of the casing $7_2$ (or $8_2$) surrounding these springs and adapted to slide. With respect to the shock absorber, and (b) A relatively stiff spring $7_3$ (or $8_3$) interposed between said casing $7_2$ (or $8_2$) and the corresponding structure 1 or 2, respectively.

The amplitude of the possible displacement of every shock absorber end $6_1$ or $6_2$ in the corresponding casing is equal to $j$; in other words as soon as the relative displacement of said end reaches values $j$ the spires of one of the flexible springs bear against one another and the stiff spring $7_3$ (or $8_3$) is brought into play.

A heavy mass 9 is fixed to the element of shock absorber 6 that is linked to mass 2 through connection 8.

The operation of this suspension device is as follows:

The small amplitude oscillations (amplitude lower than $j$) undergone by mass 2 with respect to mass 1 do not bring into play stiff springs $8_3$, but are resiliently transmitted through flexible springs $8_1$ to mass 9, which then play the part of "beater."

The weight of said mass 9 and the resiliency of springs $8_1$ and $7_1$ are chosen in such manner that the natural frequency of oscillation of said mass 9 is tuned to that of mass 2, which frequency ranges approximately from 6 to 12 Hz. The weight of mass 9 generally ranges, for this purpose, from 6 to 8 kgs. for passenger cars and the displacements corresponding to natural oscillation have an amplitude of the order of some millimeters when it works as a beater.

These displacements of mass 9 may advantageously be damped by providing a supplementary damping in connection 8, as diagrammatically illustrated at 10.

When the amplitude of the relative displacements between masses 1 and 2 exceeds value $j$ (which, for instance, ranges from 5 to 12 millimeters approximately), on every oscillation, first one of the springs $8_1$ is compressed until the spires thereof come into contact with one another, then the corresponding stiff spring 8, is deformed. The oscillations are then transmitted through said stiff spring $8_3$ to shock absorber 6 which then plays the part of a conventional shock absorber of the "relaxation" type.

The characteristic of operation of the above described device illustrated by FIG. 2, shows the variations of the resilient reaction C (which, for any static equilibrium position, is equal and opposed to the load that is supported) as a function of those of the vertical deformation $z$ of the suspension. It will be seen that this curve comprises two angular points A and B corresponding to the values $+j$ and $-j$ of deformation $z$. The discontinuities of the resilient reaction that correspond to said points correspond, for practical purposes, to shocks or noises that should be eliminated as much as possible. This is the result obtained with the embodiment of FIGS. 3 to 6 which will now be described and wherein the difference springs $7_1$, $7_3$, $8_1$ and $8_3$ consists of masses of rubber or another elastomer.

In this embodiment of the invention, the above mentioned elements 1 to 9 are to be found.

The main spring 5 is a helical compression spring and shock absorber 6 is of the telescopic hydraulic type.

Each of the conections 7 and 8 comprises (FIGS. 3 to 5):

Two cylindrical sleeves 11 and 12, concentric and coaxial (for the mean working position of the connection), the external sleeve 11 being rigid with one end of shock absorber 6 and the internal sleeve 12 being rigid either with frame 1 or with an axle carrying arm 2; and A mass 13 of rubber or another elastomer interposed between these two sleeves.

This mass 13 essentially comprises (it being supposed that the direction in which shock absorber 6 works is vertical) two horizontal arms $13_1$ connecting sleeves 11, 12 with each other, and two pads $13_2$ carried respectively above and under internal sleeve 13 opposite a complementary recess $13_3$, the distance between each pad and the bottom of the recess that corresponding thereto being equal to $j$ when the respective axes of sleeves 11 and 12 coincide together.

These arms, pads and recesses may be obtained in providing in mass 13 two cylindrical hollows $13_4$ (FIG. 4) symmetrical to each other with respect ot the horizontal plane passing through the common axis of the sleeves, as shown.

Each of said recesses is so shaped that its vertical thickness becomes zero over its whole width when, after a relative displacement equal to $j$, pad $13_2$ has come into contact with the bottom of recess $13_3$.

However, in order to avoid any risk of tearing of mass 13 in the vicinity of the edges of the recess, said edges may be of rounded shape as shown at $13_5$ so as to form a permanently open hollow.

Figure 3:
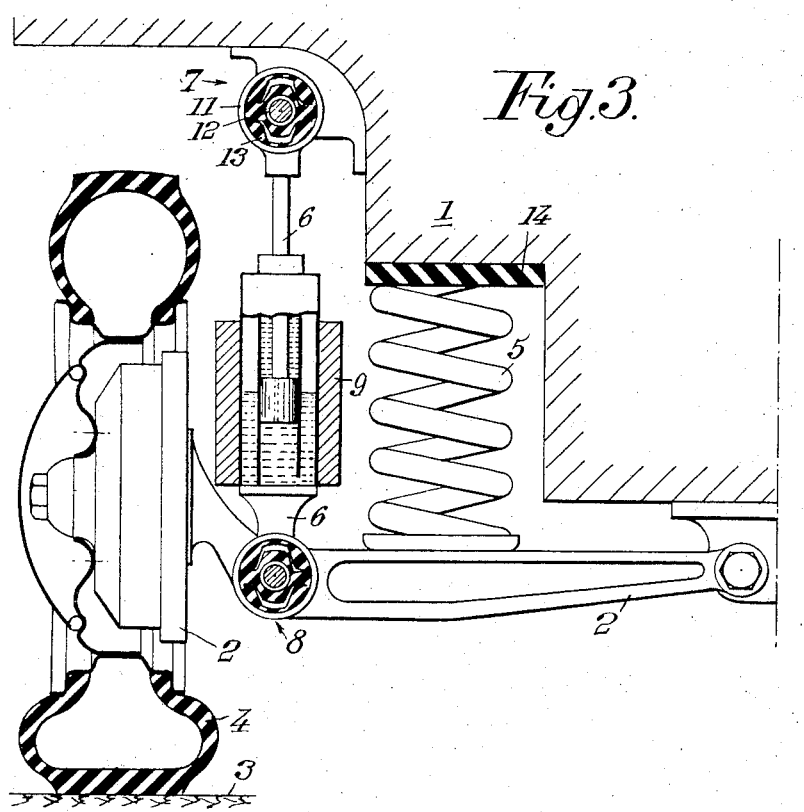
FIG. 3 is a vertical transverse sectional view of a portion of a vehicle provided with a suspension device according to the present invention.
Figures 4, 5:
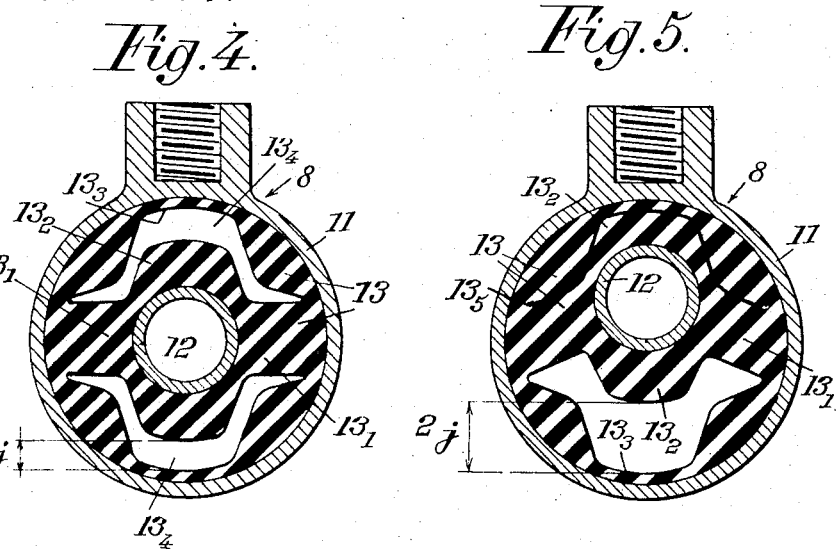
FIG. 4 is a cross section illustrating a portion of the suspension device of FIG. 3.
FIG. 5 is a view similar to FIG. 4 but corresponding to a different relative position of the parts.

In the embodiment of FIG. 3 mass 9 is in the form of a thick walled metal sleeve rigid with the external tube of shock absorber 6.

Figure 6:
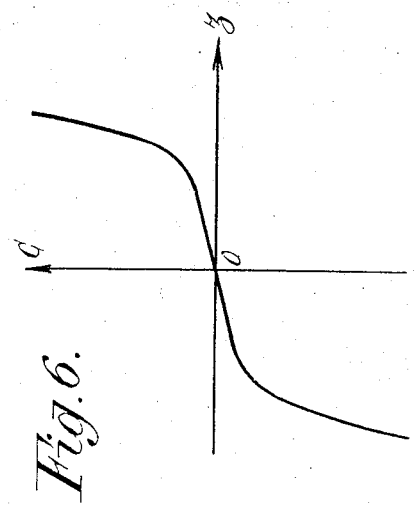
FIG. 6 shows the characteristics of operation of the device of FIGS. 3 to 5.

The device of FIG. 3 works in a manner similar to that described with reference to FIG. 1 but in a more flexible and gradual manner as illustrated by the characteristic curve of FIG. 6. For the relative vertical oscillations of low amplitude (that is to say of an amplitude smaller than $j$) of the sleeves 11 and 12 of one connection, this connection works merely by shearing of arms $13_1$, that is to say with a great flexibility. But as soon as a relative vertical displacement of the sleeves tends to exceed value $j$, one of the pads $13_2$ is applied against the bottom of the corresponding recess $13_3$ and there is produced a gradual crushing of said pad which then undergoes compression stresses.

In order to damp the oscillations of the arms $13_1$ of the lower connection 8, it suffices to constitute the corresponding mass 13 by a resilient material having a high hysteresis whereas the upper connection 9 uses a resilient material of low hysteresis.

Between spring 5 and frame 1 there may be provided a resilient pad 14 to absorb the microvibrations transmitted to the frame by said spring 5.

The device according to the present invention has, over those existing up to this time, many advantages, in particular it permits of damping all disturbing oscillations and therefore of ensuring both an excellent comfort for the passengers and an excellent holding of the road for the vehicle, with, for every wheel or set of wheels, a single shock absorber of the conventional type but arranged in a particular manner.

The heavy mass such as 9 carried by the shock absorber element linked to the half suspended mass might, instead of being rigid with this element, be resiliently connected with the suspended frame through means other than the connection between this frame and the other element of the shock absorber, this mass being for instance constituted by a transmission half suspended part such as the rear axle of the vehicle.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. In a vehicle mounted on pneumatic tires, comprising a suspended frame and a half suspended structure including wheels for supporting said suspended frame, a suspension device which comprises in combination:
   a main spring interposed between said suspended frame and a part of said half suspended structure,
   a shock absorber interposed between a part of said half suspended structure and said suspended frame, said shock absorber including two portions movable with respect to each other,
   a first resilient connection between one of said shock absorber portions and said suspended frame,
   a second resilient connection between the other of said shock absorber portions and said half suspended structure,
   both of said resilient connections being flexible for small values of the relative displacements of the parts between which they are interposed and being stiff for great values of said displacements,
   the portion of said shock absorber connected with said half suspended structure having a wall, and a means including a heavy mass rigid with said wall for absorbing oscillations of said half suspended structure of relatively high frequency.

2. A suspension device according to claim 1 wherein said main spring is a helical compression spring.

3. A suspension device according to claim 1 wherein said shock absorber is of the telescopic hydraulic type.

4. A suspension device according to claim 1 wherein said heavy mass is adapted to absorb oscillations of said half suspended structure of a frequency ranging from 6 to 12 Hertz.

5. A suspension device according to claim 1 wherein said shock absorber is of the telescopic type including two tubes slidable in each other and said heavy mass is made of a thick walled sleeve rigid with the outer tube of said shock absorber.

6. A suspension device according to claim 1 wherein said connection between said shock absorber and said half suspended structure is such that the oscillations it undergoes when transmitting small displacements are more absorbed than those corresponding to the other connection.

7. A suspension device according to claim 1 wherein each of said two connections comprises:
   two coaxial tubular casings rigid with the two parts between which said connection is interposed, respectively,
   and an intermediate mass of elastomer connecting said two tubular casings with each other and shaped to undergo, on the one hand, shearing stress for small values of the displacements in a diametral direction of one of said tubular casings with respect to the other and, on the other hand, compression stresses for great values of said displacements.

8. A suspension device according to claim 7 wherein said mass of elastomer comprises, on the one hand, two horizontal arms extending radially from one tubular casing to the other perpendicularly to the direction of said displacements, and, on the other hand, two cushions secured to said tubular casings respectively, with a clearance between them in said direction.

References Cited

UNITED STATES PATENTS 2,876,018  3/1959  Kishline _____ 280—96.2 X
3,279,782  10/1966  Schick _____ 267—33

BENJAMIN HERSH, *Primary Examiner.*

P. GOODMAN, *Assistant Examiner.*